2,806,014
Patented Sept. 10, 1957

2,806,014

COPOLYMERS OF TRIALLYL TRIMESATE AND UNSATURATED LINEAR POLYESTERS

Ellington M. Beavers, Philadelphia, Pa., and Theodore E. Bockstahler, Moorestown, N. J., assignors to Rohm & Haas Company, Philadelphia, Pa., a corporation of Delaware No Drawing. Application March 22, 1955,
Serial No. 496,046

7 Claims. (Cl. 260—45.4)

This invention relates to copolymers of triallyl trimesate and unsaturated linear polyesters; and it has for its object the preparation of such copolymers.

This application is a continuation-in-part of our abandoned application Serial No. 335,592, filed February 6, 1953.

Triallyl trimesate which is a crystalline solid melting at about 28° C. has a marked tendency to polymerize with the formation of hard, glass-like products. Furthermore, it readily copolymerizes with unsaturated linear polyesters made from glycols and $\alpha,\beta$-unsaturated dicarboxylic acids.

Triallyl trimesate which has the formula

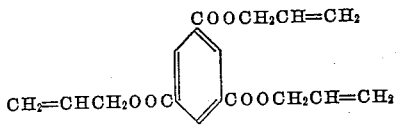

is prepared by esterifying trimesic acid with allyl alcohol in the presence of sulfuric acid. Alternatively, it is made by a transesterification reaction of allyl alcohol with a lower alkyl ester of trimesic acid, such as trimethyl or triethyl trimesate.

The following example serves to illustrate how triallyl trimesate may be made:

*Example 1*

Into a three-necked flask equipped with a thermometer, mechanical stirrer and reflux condenser was charged a mixture of 43 grams (0.20 mole) of trimesic acid, 356 grams (6.1 moles) of allyl alcohol, 10 ml. of concentrated sulfuric acid, and 0.2 gram of di-$\beta$-naphthol. The mixture was stirred, heated to boiling and refluxed for 2.25 hours. The condenser was then set for downward distillation and an azeotropic mixture of water and allyl alcohol was distilled until 200 ml. of distillate was collected. Two hundred ml. of allyl alcohol was then added to the reaction mixture, the condenser was changed, and the mixture was refluxed for an additional hour.

The hot solution was filtered and the filtrate, after cooling to room temperature, was poured over 250 grams of crushed ice. Ether was added in order to dissolve water-insoluble products and the ether solution was washed first with water, then with a dilute aqueous solution of sodium carbonate and finally with water until it was neutral. The ether solution was evaporated and the residue, a dark oil, was then distilled under reduced pressure in the presence of about 0.2% by weight of di-$\beta$-naphthol. A 65% yield of triallyl trimesate boiling at 175° to 190° C./0.1 mm. and melting at 28° to 29° C. was obtained. The composition was confirmed by analysis.

It is apparent that modifications can be made in the process above. For example, some of the allyl alcohol which served above as both solvent and reactant can be replaced by another solvent, particularly one which forms an azeotropic mixture with water, such as benzene, toluene, xylene, carbon tetrachloride, ethylene dichloride, ethylene trichloride, propylene trichloride, and the like. Furthermore, the use of ice can be eliminated and the triallyl trimesate can be separated from the reaction mixture and "worked up" by other conventional means. Other inhibitors, such as hydroquinone and copper bronze powder, may also be used instead of di-$\beta$-naphthol to prevent the polymerization of the ester while it is being prepared and isolated. It is, however, noteworthy that other common esterification catalysts such as p-toluene sulfonic acid or camphor sulfonic acid do not give rise to the same high yields that are obtained by the use of concentrated sulfuric acid.

Linear, unsaturated polyesters, such as are prepared from an $\alpha,\beta$-unsaturated aliphatic dicarboxylic acid or anhydride (e. g., maleic anhydride, maleic acid and fumaric acid) and a dihydric alcohol (e. g., ethylene, diethylene, propylene and dipropylene glycols) acquire hardness and heat-resistance when copolymerized with triallyl trimesate. The same is true of unsaturated linear polyesters which are made from an $\alpha,\beta$-unsaturated aliphatic dicarboxylic acid, a dihydric alcohol and a second dicarboxylic acid, which is free of non-benzenoid unsaturation, such as phthalic, adipic or sebacic acids. This is illustrated by the following example.

*Example 2*

Castings were made by heating in glass molds mixtures containing 30%, 50% and 70% respectively of triallyl trimesate and 70%, 50% and 30% respectively of a linear unsaturated polyester. The polyester, which had an acid number of 34, had been prepared by reacting and esterifying propylene glycol with phthalic acid and maleic anhydride, the latter two compounds being used in the ratio of 50 parts of the first and 50 parts of the second. The mixtures, which also contained 1% by weight of benzoyl peroxide as a catalyst, were heated in the absence of oxygen at 80° C. for one-half hour, then at 100° C. for one-half hour and finally at 130° C. for one hour. Every product was a clear, solvent-resistant casting having a Barcol hardness of approximately 45. The castings were extremely resistant to heat; and in this respect they had a definite advantage over similar castings of styrene or triallyl cyanurate and the same polyester. Consequently, combinations of triallyl trimesate and unsaturated linear polyesters are particularly well suited for the production of low-pressure laminates and castings.

Similarly, flexible castings which have high resistance to solvents and a Shore hardness of about 90 have been made by copolymerizing triallyl trimesate with polyesters made from $\alpha,\beta$-unsaturated aliphatic dicarboxylic acids, glycols and saturated aliphatic dicarboxylic acids such as adipic and sebacic acids.

Triallyl trimesate can be copolymerized with linear unsaturated polyesters in all proportions. Peroxidic catalysts or free-radical catalysts, as well as ultraviolet light, catalyze such copolymerizations. Among the suitable catalysts are the following: acetyl peroxide, lauroyl peroxide, succinyl peroxide, tert-butyl hydroperoxide, di-tert-butyl peroxide, tert-butyl perbenzoate, stearoyl peroxide, cumene hydroperoxide, caprylyl peroxide, azobisisobutyronitrile, methyl azoisobutyrate, and the like.

It is recommended that the copolymerization of triallyl trimesate and unsaturated linear polyesters be carried out in an oxygen-free atmosphere, i. e., in the substantially complete absence of oxygen.

Solutions of unsaturated linear polyesters in styrene are used in vast quantities, especially in conjunction with glass fiber, in the manufacture of cast, laminated and molded articles. When triallyl trimesate is added to such compositions and is copolymerized therewith, it exerts a definite and desirable hardening effect, although not to the same extent as when unsaturated linear polyesters and triallyl trimesate are copolymerized in the absence of styrene.

In many fields of use, it is most desirable that a cast, laminated or molded linear polyesters composition be capable of withstanding, at least for short periods of time, temperatures which may be as high as 260° C. Under such conditions, copolymerized compositions of triallyl trimesate and linear esters of maleic and/or fumaric acids, which polyesters may or may not contain saturated modifying acids such as phthalic and sebacic acids, have real advantages. This is borne out by the following example.

Example 3

Various compositions were prepared as detailed below and all of these, containing 1% tert-butyl perbenzoate, were cast in glass molds and were polymerized in the absence of oxygen first at 80° C. for one-half hour, then at 100° C. for one-half hour, and finally at 130° C. for an hour. The resultant castings in the form of test-slabs (1½" x ¾" x ⅛") were hung, by means of wires passing through ⅛" holes in each slab, in an oven maintained at a temperature of 260° C. The losses in weight were recorded at intervals of 4, 24, 48, and 72 hours. These losses, expressed in Table I below as the percentage of the original weight which was lost, represent a measure of the stability of the various castings at elevated temperatures. In the tabulation, the constituents of the various compositions are given in parts by weight; and TAT is an abbreviation of triallyl trimesate.

TABLE I

| No. | Composition | Percent Loss on Heating at 260° C. | | | |
|---|---|---|---|---|---|
| | | 4 Hrs. | 24 Hrs. | 48 Hrs. | 72 Hrs. |
| 1 | Triallyl Trimesate alone | 2.3 | 4.5 | 6.2 | 7.4 |
| 2 | 3 parts TAT; 1 part Polyester (I) | 1.8 | 6.1 | 10.5 | 12.7 |
| 3 | 2 parts TAT; 1 part Polyester (I) | 1.8 | 8.4 | 15.5 | 17.1 |
| 4 | 1 part TAT; 1 part Polyester (I) | 3.7 | 16.0 | 24.6 | 26.8 |
| 5 | 1 part TAT; 2 parts Polyester (I) | 12.1 | 32.1 | 37.4 | 40.2 |
| 6 | 3 parts TAT; 1 part Polyester (II) | 1.8 | 5.2 | 9.9 | 11.6 |
| 7 | 2 parts TAT; 1 part Polyester (II) | 2.1 | 6.3 | 11.5 | 14.5 |
| 8 | 1 part TAT; 1 part Polyester (II) | 2.9 | 10.3 | 17.8 | 23.1 |
| 9 | 3 parts styrene; 7 parts Polyester (III) | 15.1 | 39.7 | 46.3 | ------ |
| 10 | 3.5 parts styrene; 6.5 parts Polyester (I) | 11.9 | 36.1 | 43.2 | 46.0 |

N. B. Polyester (I) was a very viscous fluid, unsaturated, linear polyester of maleic anhydride and dipropylene glycol. Polyester (II) was a solid, unsaturated, linear polyester of fumaric acid and propylene glycol. Polyester (III) was a solid, unsaturated, linear polyester of propylene glycol and equimolar weights of phthalic anhydride and maleic anhydride.

The advantage in stability of the compositions containing triallyl trimesate is evident.

Copolymers of triallyl trimesate and linear, unsaturated polyesters are characterized by retention of structural rigidity at elevated temperatures. This property of rigidity can be evaluated by measuring the modulus of elasticity in torsion as the temperature of the composition is raised, following the A. S. T. M. procedure D1043-49T. In Table II below, the modulus of elasticity of each of the compositions described in Table I, expressed in pounds per square inch times $10^{-5}$ (p. s. i. $\times 10^{-5}$), is given at the various recorded temperatures. A higher value is a measure of greater rigidity.

TABLE II

Modulus of Elasticity (p. s. i. $\times 10^{-5}$) vs. Temperature

| Sample No. | 1 | 2 | 3 | 4 | 5 | 6 | 7 | 8 | 9 | 10 |
|---|---|---|---|---|---|---|---|---|---|---|
| Degrees C.: | | | | | | | | | | |
| 23 | 2.4 | 3.1 | 3.9 | 3.9 | 2.9 | 4.0 | 3.5 | 3.6 | 5.0 | 3.4 |
| 40 | 2.2 | 2.9 | 3.5 | 3.5 | 2.7 | 3.7 | 3.3 | 3.4 | 4.1 | 3.1 |
| 60 | 1.9 | 2.7 | 3.2 | 3.2 | 2.4 | 3.4 | 3.3 | 3.2 | 2.6 | 2.7 |
| 80 | 1.6 | 2.5 | 3.0 | 2.9 | 2.2 | 3.1 | 3.0 | 3.0 | 0.6 | 2.2 |
| 100 | 1.5 | 2.4 | 2.8 | 2.6 | 1.9 | 2.9 | 3.0 | 2.9 | 0.01 | 1.7 |
| 120 | 1.3 | 2.3 | 2.6 | 2.3 | 1.7 | 2.9 | 2.8 | 2.8 | | 1.2 |
| 140 | | 2.2 | 2.5 | 2.1 | 1.5 | 2.9 | 2.8 | 2.8 | | 0.81 |
| 160 | | 2.2 | 2.4 | 1.9 | 1.5 | 2.9 | 2.8 | 2.7 | | 0.47 |
| 180 | | | 2.3 | | | 2.9 | 2.8 | 2.7 | | 0.25 |
| 200 | | | 2.3 | | | 2.9 | 2.8 | 2.7 | | 0.17 |
| 220 | | | | | | 2.9 | 2.8 | 2.7 | | |
| 240 | | | | | | 2.9 | 2.8 | 2.7 | | |

It is evident that compositions Nos. 6, 7, and 8 had the greatest rigidity at the highest temperatures.

We claim:

1. As a new composition of matter, a resinous copolymer of triallyl trimesate and a linear unsaturated polyester, said polyester being the resinous product of esterification of a glycol and an α,β-ethylenically unsaturated aliphatic dicarboxylic acid containing only carbon, hydrogen and oxygen.

2. As a new composition of matter, a resinous copolymer of triallyl trimesate and a linear unsaturated polyester, said polyester being the resinous product of esterification of propylene glycol and maleic anhydride.

3. As a new composition of matter, a resinous copolymer of triallyl trimesate and a linear unsaturated polyester, said polyester being the resinous product of esterification of propylene glycol and fumaric acid.

4. As a new composition of matter, a resinous copolymer of triallyl trimesate and a linear unsaturated polyester, said polyester being the resinous product of esterification of propylene glycol, maleic anhydride and phthalic acid.

5. As a new composition of matter, a resinous copolymer of triallyl trimesate and a linear unsaturated polyester, said polyester being the resinous product of esterification of a glycol, an α,β-ethylenically unsaturated aliphatic dicarboxylic acid containing only carbon, hydrogen and oxygen and adipic acid.

6. As a new composition of matter, a resinous copolymer of triallyl trimesate and a linear unsaturated polyester, said polyester being the resinous product of esterification of a glycol, an α,β-ethylenically unsaturated aliphatic dicarboxylic acid containing only carbon, hydrogen and oxygen and sebacic acid.

7. As a new composition of matter, a resinous copolymer of triallyl trimesate and a linear unsaturated polyester, said polyester being the resinous product of esterification of a glycol, an α,β-ethylenically unsaturated aliphatic dicarboxylic acid containing only carbon, hydrogen and oxygen, and a second dicarboxylic acid from the group consisting of a phthalic acid and an acid of the formula $HOOC(CH_2)_nCOOH$ where $n$ is an integer from 4 to 8 inclusive.

References Cited in the file of this patent

UNITED STATES PATENTS

| 2,218,439 | Rothrock | Oct. 15, 1940 |
| 2,443,737 | Kropa | June 22, 1948 |